(12) United States Patent
Iisaka

(10) Patent No.: US 11,035,049 B2
(45) Date of Patent: Jun. 15, 2021

(54) FILM FORMING METHOD FOR METAL FILM AND FILM FORMING APPARATUS FOR METAL FILM

(71) Applicant: TOYOTA JIDOSHA KABUSHIKI KAISHA, Toyota (JP)

(72) Inventor: Hirofumi Iisaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/135,586

(22) Filed: Sep. 19, 2018

(65) Prior Publication Data
US 2019/0093247 A1  Mar. 28, 2019

(30) Foreign Application Priority Data

Sep. 28, 2017 (JP) .............................. JP2017-188428

(51) Int. Cl.
| | |
|---|---|
| *C25D 3/38* | (2006.01) |
| *C25D 17/12* | (2006.01) |
| *C25D 17/00* | (2006.01) |
| *C25D 3/46* | (2006.01) |
| *C25D 5/08* | (2006.01) |
| *C25D 5/02* | (2006.01) |

(Continued)

(52) U.S. Cl.
CPC .............. *C25D 3/38* (2013.01); *B01D 69/10* (2013.01); *C25D 3/00* (2013.01); *C25D 3/46* (2013.01); *C25D 5/02* (2013.01); *C25D 5/08* (2013.01); *C25D 17/001* (2013.01); *C25D 17/002* (2013.01); *C25D 17/005* (2013.01); *C25D 17/008* (2013.01); *C25D 17/12* (2013.01); *C25D 3/12* (2013.01); *C25D 7/123* (2013.01)

(58) Field of Classification Search
CPC ... C25D 3/00; C25D 3/12; C25D 3/38; C25D 3/46; C25D 5/02; C25D 5/08; C25D 7/123; C25D 17/001; C25D 17/002; C25D 17/005; C25D 17/008; B01D 69/10
See application file for complete search history.

(56) References Cited

U.S. PATENT DOCUMENTS

2009/0004550 A1  1/2009  McFarland et al.
2010/0276280 A1*  11/2010  Matsui .................. C25D 13/22
                                        204/283

(Continued)

FOREIGN PATENT DOCUMENTS

CN  105473769 A  4/2016
CN  105734655 A  7/2016

(Continued)

*Primary Examiner* — Nicholas A Smith
(74) *Attorney, Agent, or Firm* — Sughrue Mion, PLLC

(57) ABSTRACT

A solid electrolyte membrane is disposed between an anode and a substrate, and voltage is applied between the anode and the substrate while the solid electrolyte membrane is pressed onto the substrate so as to form a metal film on the substrate. In this film forming method, there is used the solid electrolyte membrane that includes: a first portion made of an ion permeable material; and a second portion made of a material having an electric insulating property and having a low permeability of metallic ions, the second portion being embedded in the first portion so as to be exposed from a surface of the solid electrolyte membrane, the surface of the solid electrolyte membrane facing the substrate.

5 Claims, 10 Drawing Sheets

(51) Int. Cl.
  *C25D 3/00*   (2006.01)
  *B01D 69/10*  (2006.01)
  *C25D 3/12*   (2006.01)
  *C25D 7/12*   (2006.01)

(56) References Cited

U.S. PATENT DOCUMENTS

| | | | |
|---|---|---|---|
| 2016/0090660 A1* | 3/2016 | Mitra | C25D 5/22 |
| | | | 205/136 |
| 2016/0160378 A1 | 6/2016 | Sato et al. | |
| 2016/0186353 A1* | 6/2016 | Sato | C25D 3/02 |
| | | | 205/261 |
| 2016/0265128 A1 | 9/2016 | Usui et al. | |
| 2017/0110297 A1 | 4/2017 | Teruuchi | |

FOREIGN PATENT DOCUMENTS

| | | |
|---|---|---|
| GB | 108182 A | 7/1917 |
| GB | 1098182 A | 1/1968 |
| JP | 2016-001638 A | 1/2016 |
| JP | 2016-108586 A | 6/2016 |
| JP | 2016-169398 A | 9/2016 |
| JP | 2017-101300 A | 6/2017 |
| WO | 2014/192637 A1 | 12/2014 |
| WO | 2015/025211 A2 | 2/2015 |

* cited by examiner 5 mm

FILM FORMING METHOD FOR METAL FILM AND FILM FORMING APPARATUS FOR METAL FILM

INCORPORATION BY REFERENCE

The disclosure of Japanese Patent Application No. 2017-188428 filed on Sep. 28, 2017 including the specification, drawings and abstract is incorporated herein by reference in its entirety.

BACKGROUND

1. Technical Field

The present disclosure relates to a film forming method for forming a metal film on a surface of a substrate and a film forming apparatus for the same, and particularly relates to a film forming method for forming a metal film on a surface of a substrate by applying voltage between an anode and the substrate via a solid electrolyte membrane, and a film forming apparatus for the same.

2. Description of Related Art

Conventionally, when a metal film is formed on a surface of a substrate, the metal film is sometimes formed using a film forming apparatus including a solid electrolyte membrane. In such a film forming apparatus, for example, in Japanese Patent Application Publication No. 2016-169398 (JP 2016-169398 A), there is proposed a film forming apparatus to form a metal film on a part of the surface of the substrate. This film forming apparatus includes: an anode; a solid electrolyte membrane disposed between the anode and the substrate; a solution storage part storing a metallic solution containing metallic ions such that the metallic solution comes in contact with the anode and the solid electrolyte membrane; and an electric power source applying voltage between the anode and the substrate.

The solid electrolyte membrane of the film forming apparatus is formed with recessed portions that are recessed relative to a contact surface in contact with a film forming region such that the solid electrolyte membrane comes in contact with the film forming region in the surface of the substrate, the region where the metal film is formed, and the solid electrolyte membrane is out of contact with the surface excluding the film forming region. With this configuration, since portions (specifically, projecting portions) excluding the recessed portions in the solid electrolyte membrane are partially in contact with the surface of the substrate, it is possible to form a metal film on a part of the surface of the substrate.

SUMMARY

However, when the metal film is formed using the film forming apparatus disclosed in JP 2016-169398 A, the metal film is indeed formed in the contact region in the surface of the substrate, the contact region being in contact with the projecting portions of the solid electrolyte membrane, but voltage is applied to the entire substrate; thus, metallic ions might move also around this contact area. Consequently, the metal film might be formed even in regions greatly deviating from this contact region in contact with the projecting portions of the solid electrolyte membrane.

The present disclosure provides a film forming method for a metal film that can form a metal film within a desired range in a substrate, and a film forming apparatus for the same.

In light of the above problem, the inventors have repeatedly conducted enthusiastic studies, and have finally come to such a conclusion that by bringing the metallic ions passing through the solid electrolyte membrane to move so as to be collected to a predetermined position located on the substrate side, it is possible to form the metal film in a desired region in the substrate.

A film forming method for a metal film according to the first aspect of the present disclosure, includes: supplying a metallic solution containing metallic ions such that the metallic solution comes in contact with a solid electrolyte membrane from an anode side of the solid electrolyte membrane in a state in which the solid electrolyte membrane is disposed between the anode and a substrate; pressing the solid electrolyte membrane to the substrate; and applying voltage between the anode and the substrate in a state in which the solid electrolyte membrane is pressed to the substrate so as to form a metal film deriving from the metallic ions on a surface of the substrate, wherein the solid electrolyte membrane includes: a first portion made of an ion permeable material that the metallic ions permeate; and a second portion made of a material having an electric insulating property and having a lower permeability of the metallic ions than that of the ion permeable material of the first portion, the second portion being embedded in the first portion so as to be exposed from a surface of the solid electrolyte membrane, the surface of the solid electrolyte membrane facing the substrate.

According to the first aspect of the present disclosure, when the voltage is applied between the anode and the substrate in a state in which the solid electrolyte membrane is pressed onto the substrate, the second portion becomes polarized. When the metallic ions having passed through the first portion come closer to the polarized second portion, the metallic ions are attracted toward the second portion, and then move in the vicinity of the interface between the first portion and the second portion, toward the substrate. Since the metallic solution between the substrate and the second portion functions as a Nernst diffusion layer, the metallic ions move on the surface of the substrate facing the second portion, and the metal of the metallic ions is precipitated thereon. Due to the tunnel effect, the metallic ions move in such a manner as to be collected on the surface of the substrate facing the second portion, the metal film is unlikely to be formed on the surface of the substrate facing the first portion. Accordingly, it is possible to form the metal film to be located within a desired range in the substrate. Note that the precipitation principle of the metal (film formation principle of the metal film) will be explained in the following description of the embodiment.

"The solid electrolyte membrane including the second portion formed such that when the voltage is applied, the metallic ions passing through the first portion pass around the second portion, and a metal of the metallic ions is precipitated on the surface of the substrate, the surface facing the second portion" as set forth in the first aspect of the present disclosure, as described later, can be obtained by appropriately selecting a shape and a dimension of the second portion, a rate of the second portion included in the solid electrolyte membrane, and others, under conditions of the material of the second portion in such a manner that the metal of the metallic ions is precipitated on the surface of the substrate, the surface facing the second portion when voltage is applied.

In the first aspect of the present disclosure, the solid electrolyte membrane may include the second portion formed such that when the voltage is applied, the metallic ions passing through the first portion pass around the second portion, and a metal of the metallic ions is precipitated on the surface of the substrate, the surface of the substrate facing the second portion.

Further, in the first aspect of the present disclosure, the second portion may include portions swelling toward the side where the substrate is disposed. According to this aspect, because the second portion has portions swelling toward the side where the substrate is disposed, the metallic ions move around the swelling portions of the second portion, so that the metallic ions can easily move. Accordingly, it is possible to form the metal film in a finer area.

In this case, the second portion may include multiple blocks, multiple wires, multiple particles, or multiple fibers. For example, if the second portion is formed by multiple fibers, the metallic ions move along the surface of the substrate, the surface facing the respective fibers of the multiple fibers, and the metal thereof is precipitated thereon; therefore, it is possible to form, on the surface of the substrate, the metal film with a pattern corresponding to the fiber patterns of the multiple fibers.

In the case in which the second portion is formed by the multiple fibers, "the second portion formed such that when the voltage is applied, the metallic ions passing through the first portion pass around the second portion, and a metal of the metallic ions is precipitated on the surface of the substrate, the surface facing the second portion" set forth in the first aspect of the present disclosure corresponds to the "second portion formed by the multiple fibers"; and by using the multiple fibers, it is possible to precipitate the metal of the metallic ions on the surface of the substrate, facing the respective fibers.

In the first aspect of the present disclosure, the second portion includes multiple fibers extending along one direction with intervals between the fibers, wherein the film forming method includes: pressing the solid electrolyte membrane to the substrate and applying voltage so as to form a metal film with a stripe pattern including linear first metallic projections where the metal is precipitated, on the surface of the substrate, the surface facing the fibers (first film forming step); after the first film forming step, turning the substrate or the solid electrolyte membrane with the metal film facing the solid electrolyte membrane; and after turning the substrate or the solid electrolyte membrane, by pressing the solid electrolyte membrane to the substrate and applying voltage, forming linear second metallic projections where the metal is precipitated, along a direction intersecting the direction where the first metallic projections extend so as to form a metal film with a grid pattern including the first metallic projections and the second metallic projections (second film forming step).

According to this aspect, through the first film forming step and the second film forming step, the metal film with a grid pattern can be formed; therefore, it is possible to promote an anchor effect on the surface of the substrate.

The present specification discloses a film forming apparatus for suitably carrying out the aforementioned film forming method for a metal film. The film forming apparatus for a metal film according to the second aspect of the present disclosure relates to a film forming apparatus for a metal film, including: an anode; a solid electrolyte membrane disposed between the anode and the substrate; a solution storage part storing a metallic solution containing metallic ions such that the metallic solution comes in contact with the solid electrolyte membrane from an anode side of the solid electrolyte membrane; a pressing part pressing the solid electrolyte membrane to the substrate; and an electric power source applying voltage between the anode and the substrate, wherein the film forming apparatus forms a metal film deriving from the metallic ions on a surface of the substrate by applying voltage by the electric power source. The solid electrolyte membrane of the second aspect of the present disclosure includes: a first portion made of an ion permeable material that the metallic ions permeate; and a second portion made of a material having an electric insulating property and having a lower permeability of the metallic ions than that of the ion permeable material, the second portion being embedded in the first portion so as to be exposed from a surface of the solid electrolyte membrane, the surface of the solid electrolyte membrane facing the substrate.

According to the second aspect of the present disclosure, in the state in which the solid electrolyte membrane is pressed onto the substrate by the pressing part, when voltage is applied between the anode and the substrate by the electric power source, the second portion becomes polarized, and the metallic ions having passed through the first portion come closer to the polarized second portion. The metallic ions are further attracted to the second portion, and move through the vicinity of the interface between the first portion and the second portion toward the substrate. Since the metallic ions permeate the first portion, the metallic solution slightly oozes, so that the metallic solution is present between the substrate and the second portion, thus functioning as the Nernst diffusion layer. Hence, the metallic ions move to the surface of the substrate facing the second portion, and the metal of the metallic ions is precipitated thereon. In addition, due to the tunnel effect, the metallic ions move in such a manner as to be collected on the surface of the substrate facing the second portion, the metal film is unlikely to be formed on the surface of the substrate facing the first portion. Accordingly, it is possible to form the metal film so as to be located within a desired range in the substrate. The precipitation principle of this metal (film formation principle of the metal film) will be explained in detail in the following description of the embodiment.

In the second aspect of the present disclosure, the second portion may be formed such that when the voltage is applied, the metallic ions passing through the first portion pass around the second portion, and a metal of the metallic ions is precipitated on the surface of the substrate, the surface of the substrate facing the second portion.

In the second aspect of the present disclosure, the surface from which the second portion is exposed may include portions swelling toward a side where the substrate is disposed. According to this aspect, because the second portion has the portions swelling toward the side where the substrate is disposed, the metallic ions move around the swelling portion of the second portion, so that the metallic ions can easily move. Accordingly, it is possible to form the metal film in a finer area.

Here, the second portion may include, for example, multiple blocks, multiple wires, multiple particles, or multiple fibers. For example, if the second portion is formed by multiple fibers, the metallic ions move to the surface of the substrate, the surface facing the respective fibers of the multiple fibers, and the metal of the metallic ions is precipitated on the surface; therefore, it is possible to form, on the surface of the substrate, the metal film with a pattern corresponding to the fiber patterns of the multiple fibers.

In the case in which the second portion is formed by the multiple fibers, "the second portion formed such that when the voltage is applied, the metallic ions passing through the first portion pass around the second portion, and a metal of the metallic ions is precipitated on the surface of the substrate, the surface facing the second portion" in the second aspect of the present disclosure corresponds to the "second portion formed by the multiple fibers"; and by using the multiple fibers, it is possible to precipitate the metal of the metallic ions on the surface of the substrate facing the respective fibers.

In the second aspect of the present disclosure, the second portion may include multiple fibers extending along one direction with intervals between the fibers. According to this aspect, by pressing the solid electrolyte membrane to the substrate and applying voltage, a metal film with a stripe pattern configured by linear metallic projections where the metal is precipitated can be formed on the surface of the substrate, the surface facing the respective fibers. Furthermore, after the solid electrolyte membrane is removed from the substrate, in the state in which the metal film faces the solid electrolyte membrane, the substrate or the solid electrolyte membrane is turned by a predetermined turning angle (e.g. 90°), and thereafter, the solid electrolyte membrane is pressed to the substrate and voltage is applied, to thereby form a metal film with a grid pattern formed by the linear metallic projections and newly-formed linear metallic projections.

In addition, in the second aspect of the present disclosure, the solid electrolyte membrane may be set to be a first solid electrolyte membrane, and a second solid electrolyte membrane made of an ion permeable material that the metallic ions permeate may be stacked on the first solid electrolyte membrane on the side where the second solid electrolyte membrane comes in contact with the metallic solution in the solution storage part. According to this aspect, when a metal film having different film formation patterns is formed, simply by removing the first solid electrolyte membrane from the second solid electrolyte membrane, and replacing this with a different first solid electrolyte membrane, because the solution storing part is sealed by the second solid electrolyte membrane, it is possible to prevent leakage of the metallic solution from the solution storing part.

According to the present disclosure, it is possible to form the metal film located within a desired range of the substrate.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a film forming apparatus that can suitably carry out film formation of a metal film according to embodiments of the present disclosure will be described with reference to FIG. 1 to FIG. 3.

Figure 1:
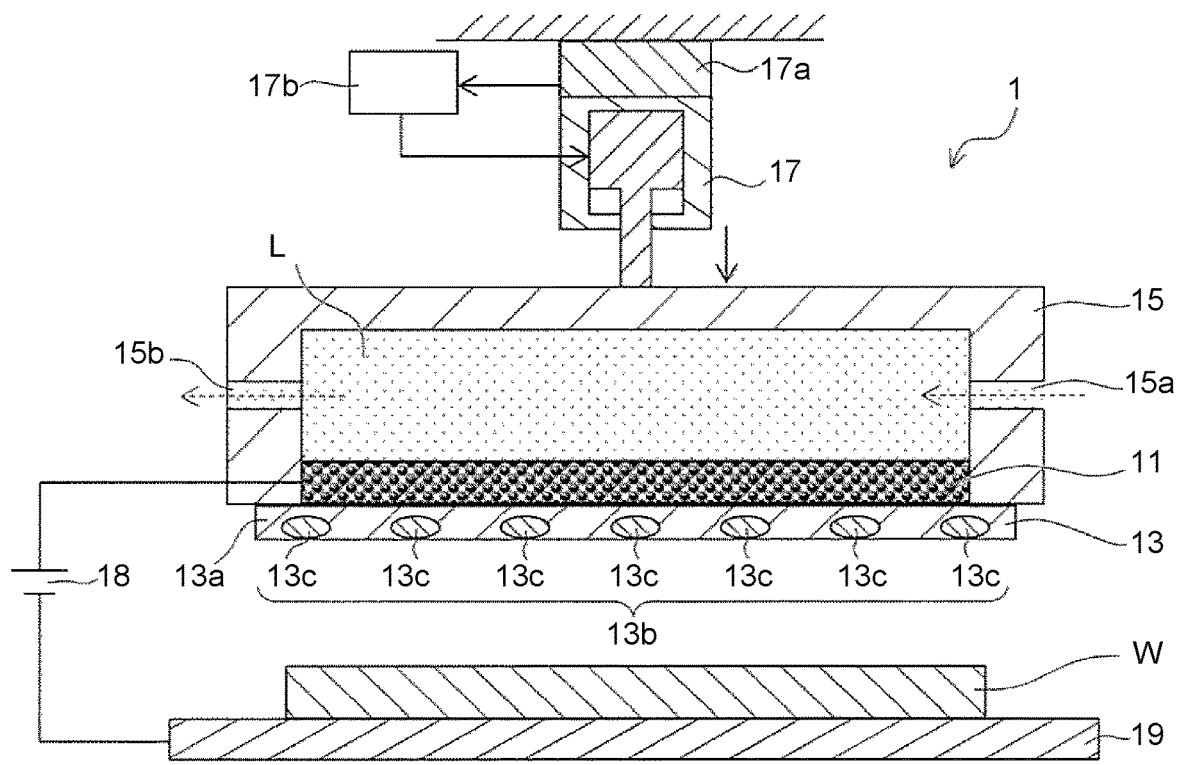
FIG. 1 is a schematic exploded sectional view of a film forming apparatus for a metal film of embodiments of the present disclosure.
Figure 2A:
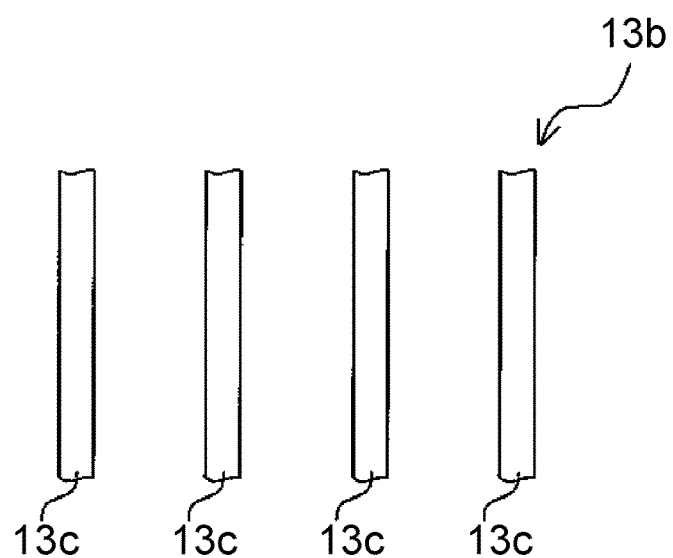
FIG. 2A is a view showing a state of fibers included in a solid electrolyte membrane shown in FIG. 1.
Figure 2B:
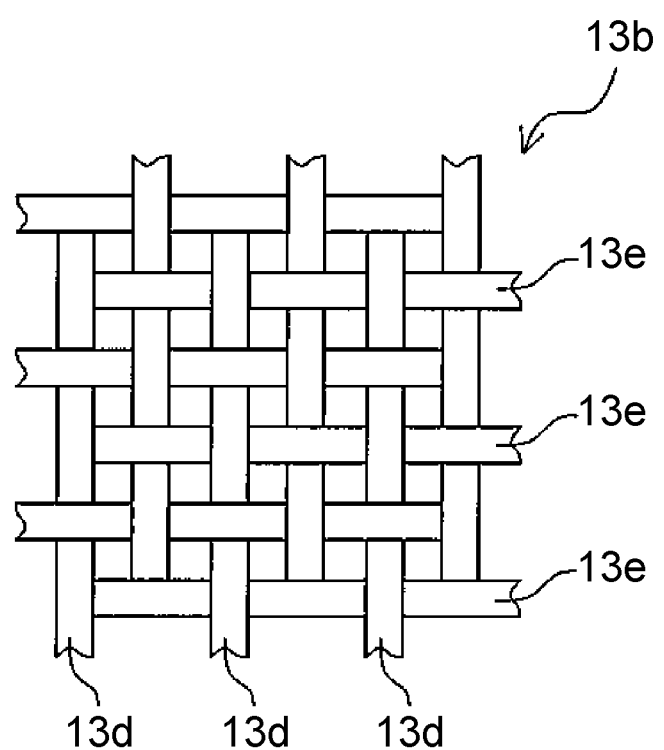
FIG. 2B is a view showing a variation of fibers shown in FIG. 2A.
Figure 2C:
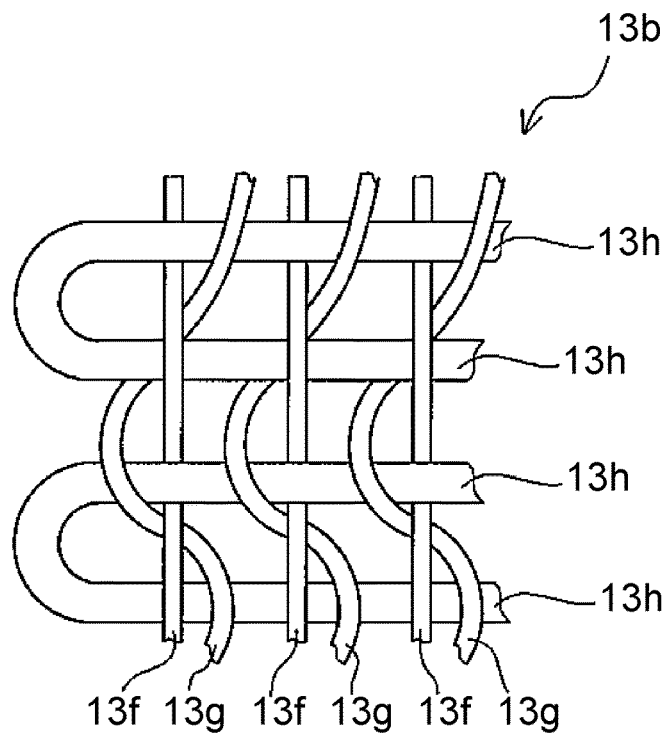
FIG. 2C is a view showing another variation of the fibers shown in FIG. 2A.

FIG. 1 is a schematic exploded sectional view of a film forming apparatus 1 for a metal film of the embodiments of the present disclosure. FIG. 2A is a view showing a state of fibers included in a solid electrolyte membrane 13 shown in FIG. 1, and FIG. 2B and FIG. 2C show variations of the fibers shown in FIG. 2A. The film forming apparatus 1 according to the present embodiment is an apparatus forming a metal film on a surface of a substrate W.

The substrate W may be formed by an aluminum (aluminum or aluminum alloy)-base material, a copper (copper or copper alloy)-base material, or a nickel (nickel or nickel alloy)-base material; and alternatively, the substrate W may be a substrate including a surface layer of one of the above metals formed on a surface of a non-conductive substrate, such as a silicon substrate and a resin substrate.

The film forming apparatus 1 includes an anode 11, the solid electrolyte membrane 13 disposed between the anode 11 and the substrate W serving as a cathode, and a solution storage part 15 storing a metallic solution L containing metallic ions such that the metallic solution L comes in contact with the solid electrolyte membrane 13 from the anode 11 side. Furthermore, the film forming apparatus 1 includes a pressing part 17 pressing the solid electrolyte membrane 13 onto the substrate W, an electric power source 18 applying voltage between the anode 11 and the substrate W, and a placement table 19 on which the substrate W is placed.

The placement table 19 is made of a metallic material, and electrically connects the substrate W and the electric power source 18 via the placement table 19. In the present embodiment, although the film forming apparatus 1 includes the placement table 19, the placement table 19 may be omitted as far as the substrate W can stably be pressed by the solid electrolyte membrane 13, and the substrate W can be electrically connected to the electric power source 18.

As an example of the anode 11, ruthenium oxide, platinum, or iridium oxide, which are insoluble in the metallic solution L, can be listed; and the anode 11 may be an anode formed by a copper plate coated with one of these metals. In the present embodiment, the anode 11 may be a soluble anode formed by the same metal (metal of metallic ions in the metallic solution L) as the metal of the metal film, and for example, if the metal film is a nickel film, the anode 11 is formed by nickel.

In the present embodiment, the anode 11 is made of a porous material that the metallic solution L permeates and supplies the metallic ions to the solid electrolyte membrane. The porous material is not limited to a specific one, and any material may be employed as far as the porous material (1) has a corrosion resistance against the metallic solution L, (2) has enough electric conductivity for acting as an anode, (3) allows the metallic solution L to permeate the porous material, and (4) can be pressurized by the pressing part 17 described later; and for example, as an example of the above porous material, a metallic foamed body, such as titanium foam, having a smaller ionization tendency (or having a higher electrode potential) than that of plated metallic ions, and the metallic foamed body is formed by continuous foamed body having open pores.

In the present embodiment, the porous body is used for the anode 11, but the anode 11 may be made of a non-porous body as far as a space can be provided between the solid electrolyte membrane 13 and the anode 11, and the metallic solution L can be stored in this space.

The solid electrolyte membrane 13 can soak up the metallic ions thereinside when being in contact with the metallic solution L as described above, and can precipitate a metal deriving from the metallic ions on the surface of the substrate W when the voltage is applied by the electric power source 18. Detailed description of the configuration of the solid electrolyte membrane 13 will be provided later.

The solution storage part 15 stores the metallic solution L such that the metallic solution L is in contact with the solid electrolyte membrane 13 on the anode 11 side. The solution storage part 15 is sealed by the solid electrolyte membrane 13 from the side where the substrate W is disposed. In the present embodiment, the anode 11 is a porous body; therefore, if the solution storage part 15 on the anode 11 side is charged with the metallic solution L while the anode 11 and the solid electrolyte membrane 13 are stacked, the metallic solution L permeates the anode 11, and the metallic solution L having permeated the anode 11 comes in contact with the solid electrolyte membrane 13 from the anode 11 side.

The solution storage part 15 is formed with a supply passage 15a supplying the metallic solution L, and a discharge passage 15b discharging this metallic solution. The solution storage part 15 is made of an insoluble material to the metallic solution L, and may be formed by either of metal and resin.

An example of the metallic solution L may include an electrolyte containing ions of copper, nickel, silver, or the like, the composition of the metallic solution L is not limited to a specific one as far as the metal to be the metal film can stay in an ionic state. An example of a solvent of the metallic solution L may include water, alcohol, or the like. For example, in the case of nickel ions, an example of the solvent of the metallic solution L may include nickel sulfate, nickel nitrate, nickel acetate, or the like.

The solution storage part 15 is connected to a supply source (not illustrated) supplying the metallic solution L, and the metallic solution L supplied from the supply source is supplied via the supply passage 15a into the inside of the solution storage part 15, and is then discharged from the discharge passage 15b to the outside of the solution storage part 15.

The pressing part 17 is a device configured to be connected to the solution storage part 15, and to press the solid electrolyte membrane 13 onto the substrate W. A mechanism of the pressing part 17 is not limited to a specific one as far as the solid electrolyte membrane 13 can be pressed onto the substrate W by moving the solution storage part 15 toward the substrate W. For example, as an example of the pressing part 17, an electric actuator of a direct driven type configured to move the solution storage part 15 toward the substrate W is exemplified, but a cylinder of a hydraulic type or a pneumatic type that moves the solution storage part 15 toward the substrate W may also be employed.

In addition, in the present embodiment, the film forming apparatus 1 may further include, if necessary, a pressure measurement unit 17a like a load cell configured to measure a pressure pressed by the pressing part 17, and a controller 17b configured to control the pressure by the pressing part 17 such that the pressure measured by the pressure measurement unit 17a becomes constant. Although not illustrated in detail in FIG. 1, if the pressing part 17 is an electric actuator of a direct driven type, the controller 17b controls current to be supplied to the actuator of a direct driven type. If the pressing part 17 is a cylinder of a hydraulic type or a pneumatic type, the controller 17b controls pressure of a working fluid to be supplied to the pressing part 17.

In the present embodiment, the electric power source 18 is a DC power source to apply voltage between the anode 11 and the substrate W, but the electric power source 18 may be an AC power source as far as the electric power source can apply voltage between the anode 11 and the substrate W. A positive electrode of the electric power source 18 is connected to the anode 11, and a negative electrode of the electric power source 18 is connected to the placement table 19. The placement table 19 is electrically connected to the substrate W, as described later. Hence, the substrate W serves as a cathode.

In the present embodiment, the solid electrolyte membrane 13 includes: a first portion 13a formed by an ion permeable material that the metallic ions permeate; and a second portion 13b formed by a material having an electric insulating property and having a lower permeability of the metallic ions than that of the ion permeable material of the first portion 13a. The "material having a lower permeability of the metallic ions" referred to in the present specification also includes a "material that no metallic ions permeate".

The material of the first portion 13a is not limited to a specific one as far as the material is an ion permeable material that the metallic solution permeates, and for example, as the material of the first portion 13a, fluorine-based resins such as Nafion (R) manufactured by DuPont, Inc., carbohydrate-based resins, polyamic acid resins, and solid electrolyte (resin) having a cation exchange function such as Selemion (CMV, CMD, CMF series) manufactured by Asahi Glass Co., Ltd., and others may be listed. A film thickness of the solid electrolyte membrane 13 may be 100 to 300 μm.

The material of the second portion 13b is not limited to a specific one as far as the material has an electric insulating property, and also has a lower permeability of the metallic ions than that of the ion permeable material of the first portion 13a; and this material is formed by a dielectric substance to be polarized when voltage is applied by the electric power source 18, such as nylon 66, MC nylon, polytetrafluoroethylene (PTFE), vinyl chloride, and others.

The present inventor has measured mechanical characteristics of the above-exemplified materials of the first portion 13a and the above-exemplified materials of the second portion 13b; and they were both made of resin materials, and thus they had almost the same mechanical characteristics. Accordingly, during the film formation as described later, when the solid electrolyte membrane 13 was pressed onto the substrate W, the second portion was not separated from the first portion 13a. In particular, if the first portion 13a is formed by a fluorine-based resin, and the second portion 13b is formed by a fluorine-based resin such as polytetrafluoroethylene (PTFE), it is possible to promote enhancement of a tight contact between them.

In this case, the second portion 13b is embedded in the first portion 13a in such a manner that the second portion 13b is exposed from the surface of the solid electrolyte membrane 13, the surface facing the substrate W. In the present embodiment, the second portion 13b is embedded in the solid electrolyte membrane 13 only on the substrate W side. The second portion 13b is formed such that when voltage is applied between the anode 11 and the substrate W by the electric power source 18, the metallic ions passing through the first portion 13a pass around the second portion 13b, and the metal of the metallic ions is then precipitated on the surface of the substrate W, the surface facing the second portion 13b.

The above-configured second portion 13b can be obtained by appropriately selecting a shape and a dimension of the second portion 13b, a ratio of the second portion 13b contained in the solid electrolyte membrane 13, and others under the above-described conditions of the material of the second portion 13b, in such a manner that when voltage is applied, the metal of the metallic ions is precipitated on the surface of the substrate W, the surface facing the second portion 13b.

Such a second portion 13b may be configured by multiple blocks, multiple wires, multiple particles, or multiple fibers; and the multiple fibers may be either of long fibers and short fibers. In the present embodiment, the second portion 13b is formed by fibers 13c extending in one direction (that is, aligned in line in one direction) with intervals between the fibers as shown in FIG. 2A. In FIG. 1 and FIG. 3, the dimension and the number of the fibers 13c are schematically illustrated, and for example, it is preferable to align approximately 1.6 to 16 fibers 13c per 1 cm.

As another aspect, the second portion 13b may be formed by plain fabric woven by multiple warps (fibers) 13d and multiple woofs (fibers) 13e, as shown in FIG. 2B; and fabric other than this, such as twill fabric and satin fabric, may also be employed.

Other than the above fabric, as shown in FIG. 2C, the second portion 13b may be formed by leno weave fabric (cross weave fabric) structured by twisting warps (fibers) 13f and sacrifice yarns (fibers) 13g around woofs (fibers) 13h. In each of the warps (fibers) 13f and the woofs (fibers) 13h, it is preferable to align approximately 1.6 to 16 fibers per 1 cm. As shown in FIG. 2B and FIG. 2C, if the second portion 13b is fabric formed by multiple fibers, it is possible to increase strength of the solid electrolyte membrane 13.

Each of the multiple fibers shown in FIG. 2A to FIG. 2C has an oval sectional shape, and as shown in FIG. 1, because of this shape, each of these fibers included in the second portion 13b has a portion swelling toward the side where the substrate W is disposed.

Figure 6:
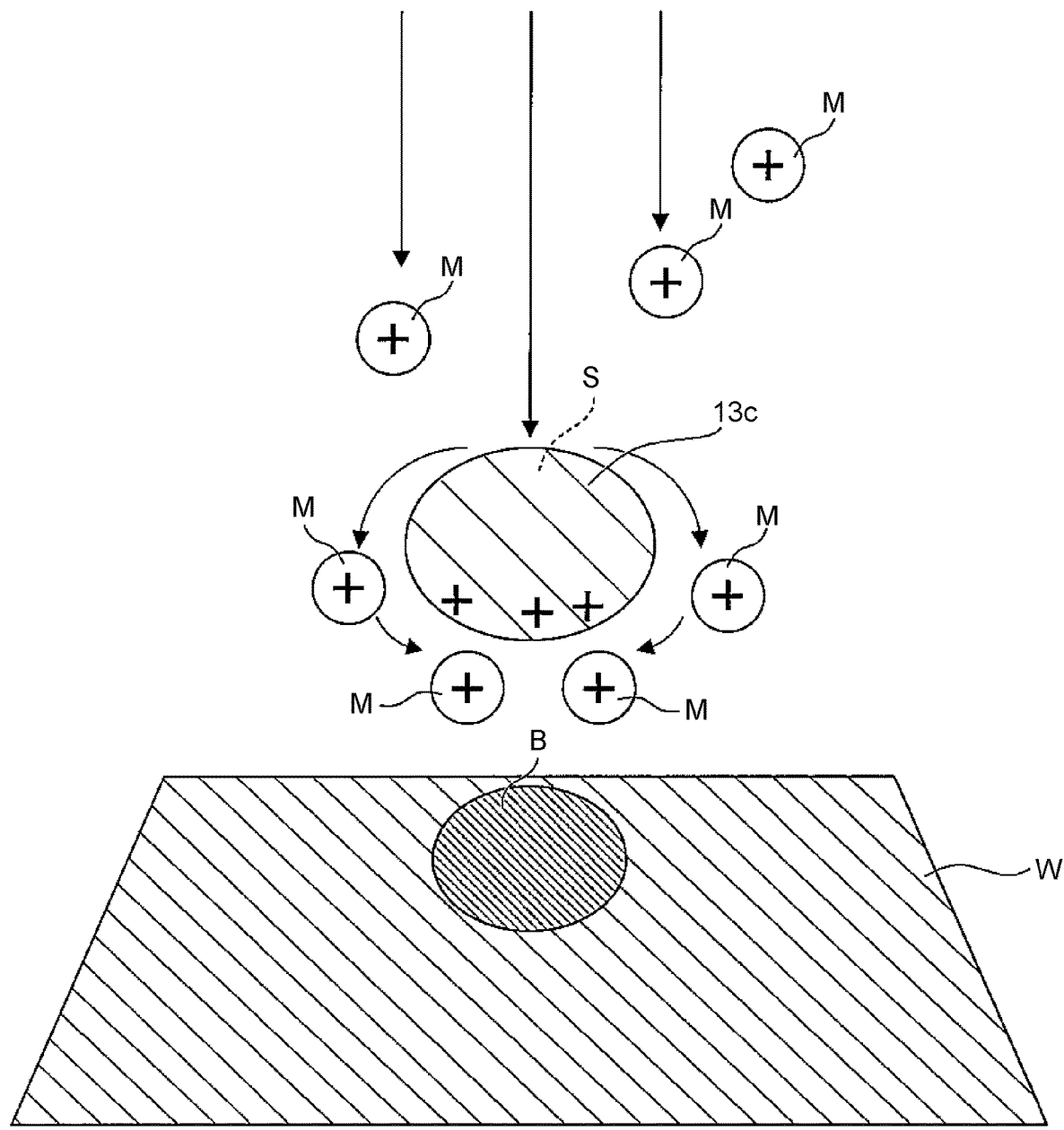
FIG. 6 is a view explaining a film formation principle according to the present embodiment.

With this configuration, as shown in FIG. 6 described later, during the film formation, the metallic ions move around the swelling portions of the fibers of the second portion 13b, so that the metallic ions can easily move. Accordingly, it is possible to form the metal film in a finer area. As far as each fiber has such a swelling portion, the sectional shape of each fiber may be any shape, such as a circular shape and a polygonal shape, and the sectional shape thereof is not limited to a specific one.

A fiber diameter of each fiber may be within a range of 12 to 70 μm. An aspect ratio of each fiber may be within a range of 1 to 10 or 1 to 3. The aspect ratio is a ratio between a width of a longer axis of the section (maximum width of the section) and a width of a shorter axis orthogonal to the longer axis; and an aspect ratio of a circle is 1. By satisfying these ranges, the metallic ions passing through the first portion 13a of the solid electrolyte membrane 13 are likely to pass around the fibers, and be easily collected at the swelling portions of the respective fibers.

Figure 3:
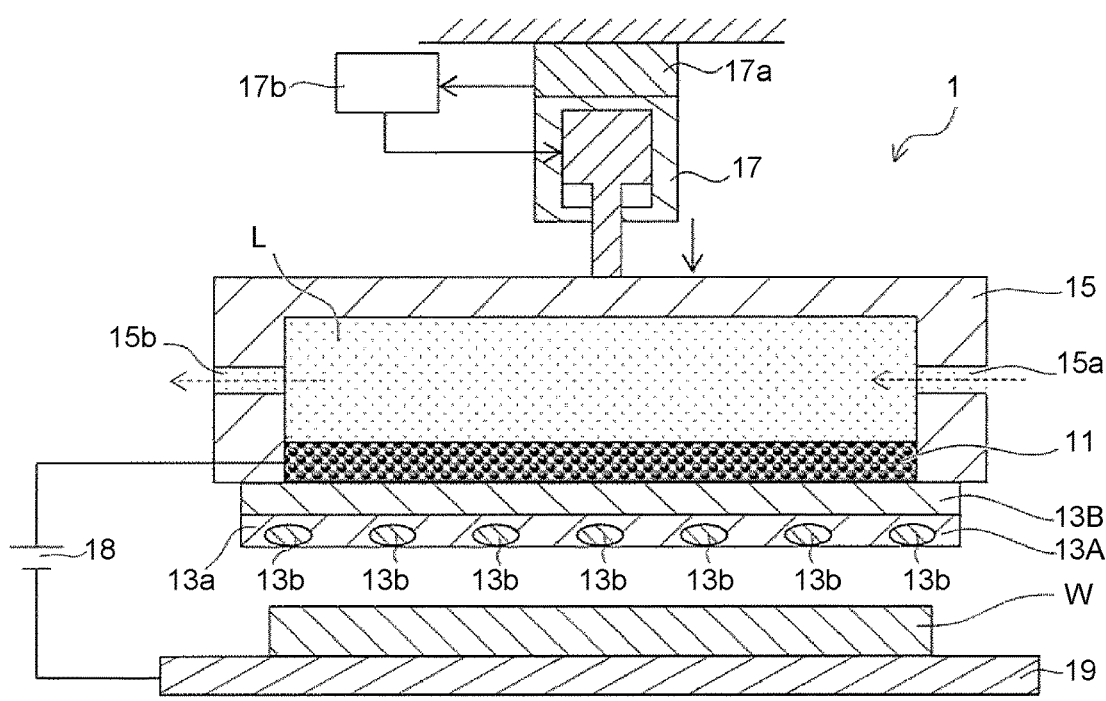
FIG. 3 is a variation of the film forming apparatus shown in FIG. 1.

FIG. 3 is a variation of the film forming apparatus shown in FIG. 1. This film forming apparatus is different from the film forming apparatus shown in FIG. 1 in that solid electrolyte membranes are stacked. The other configurations are the same, and thus detailed description thereof will be omitted.

As shown in FIG. 3, in the present embodiment, the solid electrolyte membrane 13 of the film forming apparatus 1 shown in FIG. 1 is defined to be a first solid electrolyte membrane 13A, and a second solid electrolyte membrane 13B, formed by the same ion permeable material as that of the first portion 13a, is stacked on the first solid electrolyte membrane 13A on the side where the second solid electrolyte membrane 13B comes in contact with the metallic solution L of the solution storage part 15. Specifically, the second solid electrolyte membrane 13B seals the solution storage part 15.

According to this film forming apparatus 1, it may be configured that when a metal film having a different film pattern is formed, the first solid electrolyte membrane 13A is removed from the second solid electrolyte membrane 13B, and then another first solid electrolyte membrane 13A for forming a metal film having a different film pattern is mounted to the second solid electrolyte membrane 13B. In the present embodiment, since the solution storage part 15 is sealed by the second solid electrolyte membrane 13B, it is possible to prevent leakage of the metallic solution L from the solution storage part 15.

Figure 4:
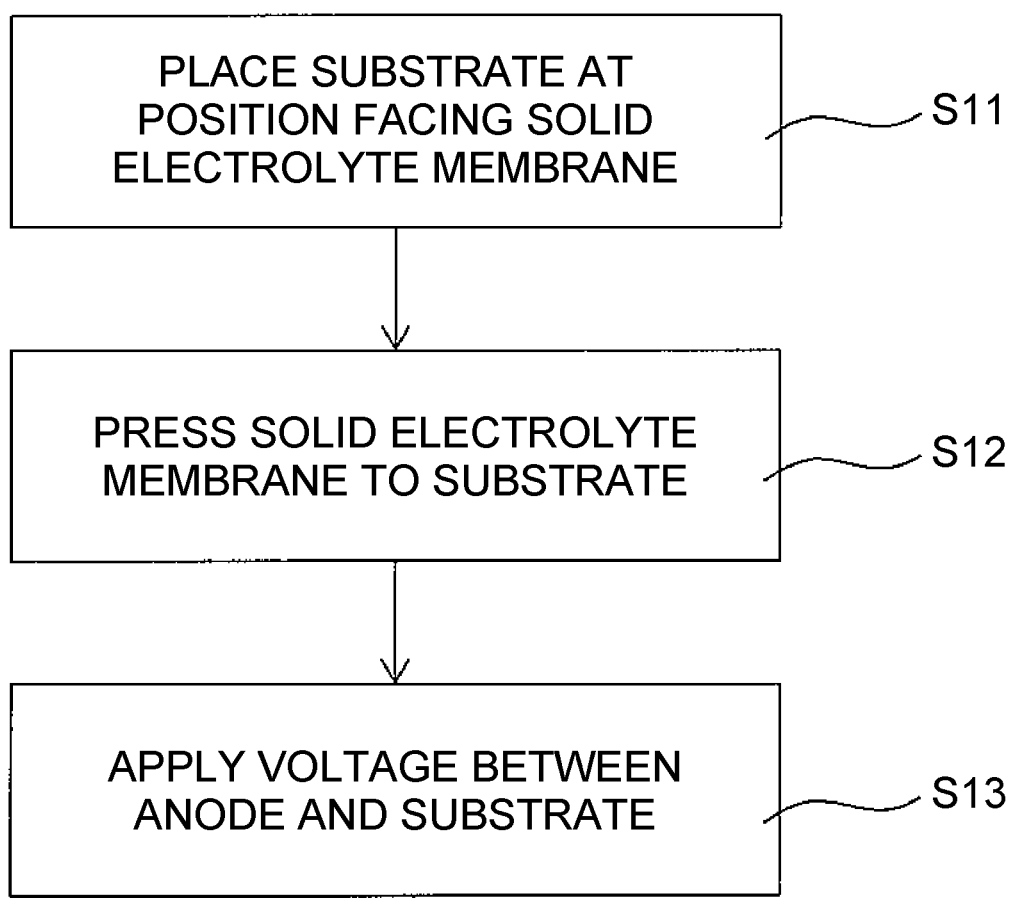
FIG. 4 is a flowchart explaining a first film forming method using the film forming apparatus shown in FIG. 1.

A first film forming method for the metal film according to the embodiments will be described, hereinafter. FIG. 4 is a flowchart explaining the first film forming method using the film forming apparatus 1 shown in FIG. 1. First, in step S11, as shown in FIG. 1, the substrate W is placed at a position facing the solid electrolyte membrane 13. With this, the solid electrolyte membrane 13 is disposed between the anode 11 and the substrate W. In the film forming apparatus 1 shown in FIG. 1, with the above-described structure, the metallic solution L is disposed in the solution storage part 15 such that the metallic solution L containing the metallic ions comes in contact with the solid electrolyte membrane 13 from the anode 11 side.

Next, in step S12, the solid electrolyte membrane 13 is pressed onto the substrate W by the pressing part 17. During this pressing, it is possible that the pressure pressed by the pressing part 17 is measured by the pressure measurement unit 17a, and the pressing of the pressing part 17 is controlled by the controller 17b so as to set the pressure measured by the pressure measurement unit 17a to be constant. Through this control, it is possible to press the solid electrolyte membrane 13 onto the substrate W in a stable manner, to thereby form a homogeneous metal film F.

Figure 5:
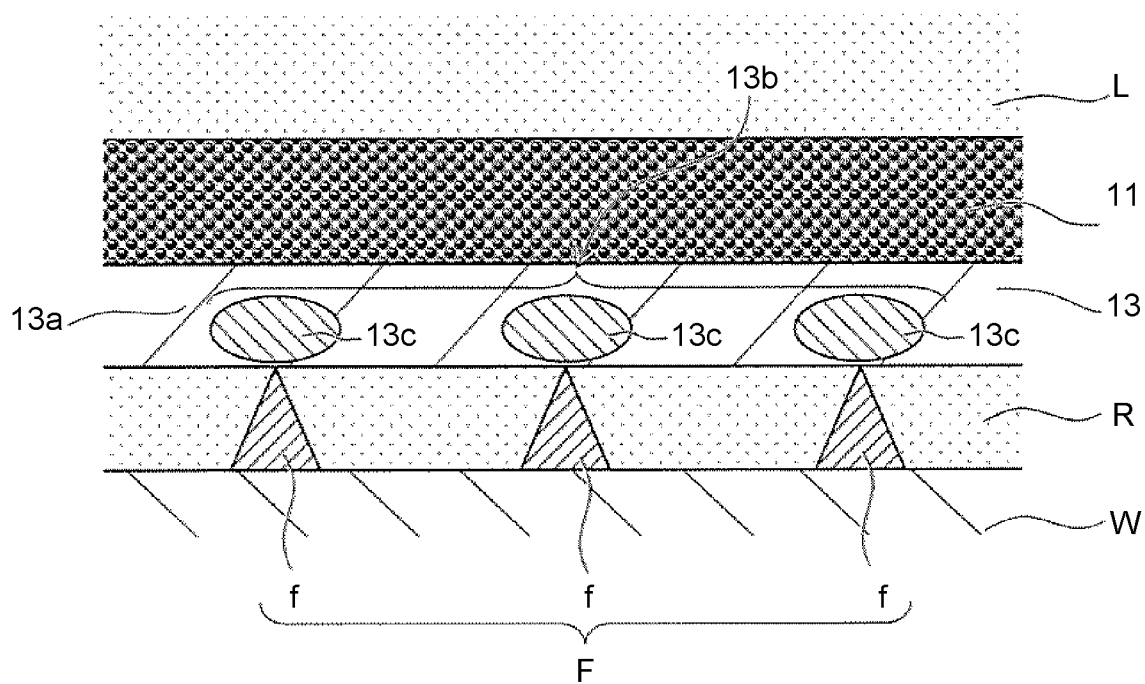
FIG. 5 is a schematic sectional view explaining a film formation state of a surface of a substrate.

Subsequently, in step S13, by applying voltage between the anode 11 and the substrate W by the electric power source 18 while maintaining this pressing state, the metal film F deriving from the metallic ions is formed on the substrate W. With this film formation, as shown in FIG. 5, the portion of the solid electrolyte membrane 13, the portion facing the second portion 13b, becomes a precipitating region where the metal is precipitated, and the portion of the solid electrolyte membrane 13, the portion facing the first portion 13a, becomes a non-precipitating region where the metal is unlikely to be precipitated. Because the second portion 13b is formed by the multiple fibers 13c extending in one direction, it is possible to form the metal film F with a stripe pattern, which is formed by linear metallic projections f where the metal is precipitated.

For example, as shown in FIG. 2C, if leno weave fabric is used for the second portion 13b, according to the experiments conducted by the inventors described later, the woofs (fibers) 13h having thicker element yarns than those of the warps (fibers) 13f and the sacrifice yarns 13g are more likely to be strongly pressed onto the substrate W, to thus form the metal film F with a stripe pattern.

In addition, the section of each of the linear metallic projections f (section orthogonal to the direction where the metallic projections f extend) has a triangular sectional shape, which sharply projects in a direction apart from the substrate W. Such a shape promotes an anchor effect of the surface of the substrate W on which the metal film F is formed.

Figure 7:
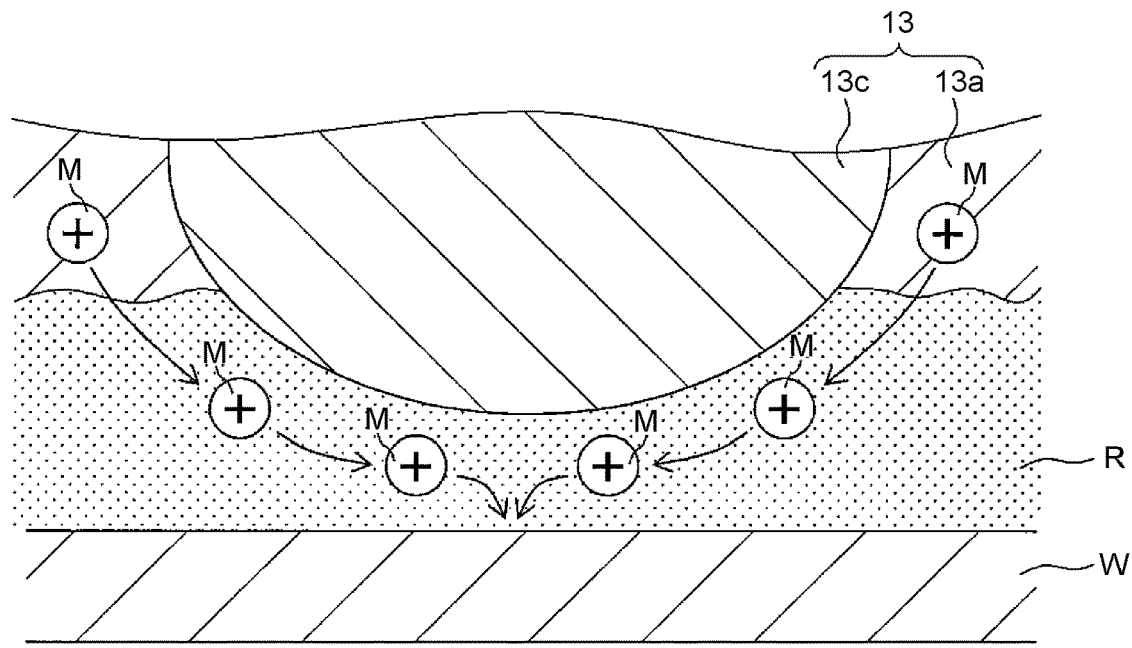
FIG. 7 is an enlarged sectional view of a major part of FIG. 6.
Figure 8:
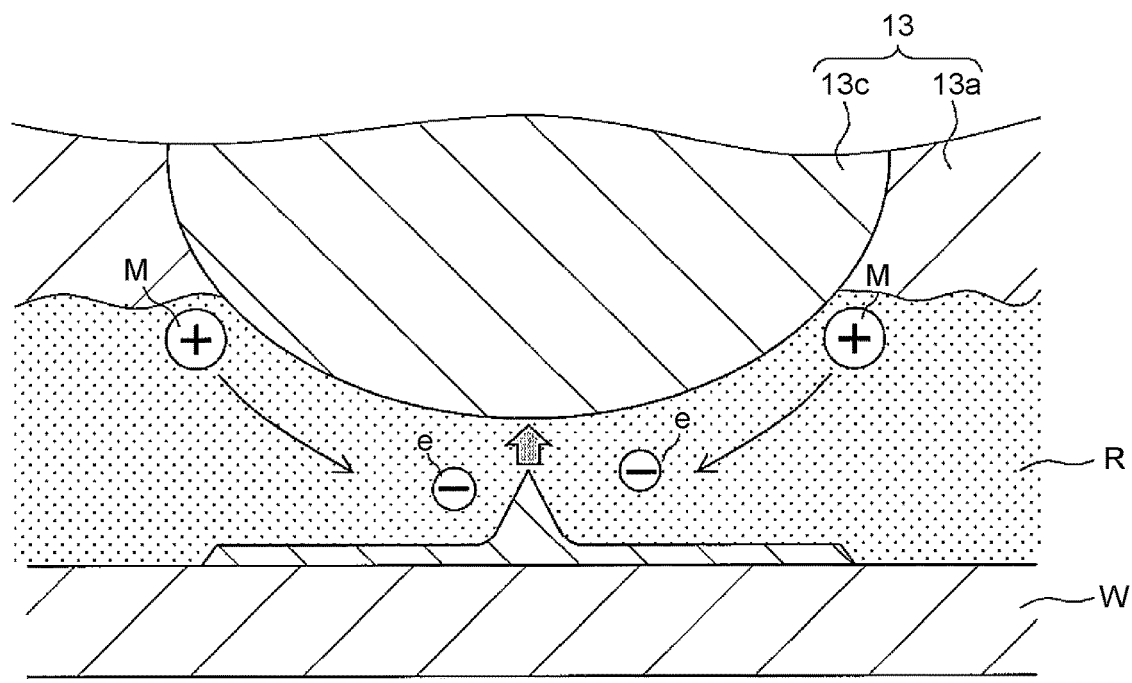
FIG. 8 is a view explaining a growth state of a metallic projection during the film formation.

Here, with reference to FIG. 6 to FIG. 8, the film formation principle of the above-described metal film F will be described. FIG. 6 is a view explaining the film formation principle according to the present embodiment. FIG. 7 is an enlarged sectional view of the major part of FIG. 6. FIG. 8 is a view explaining a growth state of the metallic projection during the film formation.

Normally, a minimum passage of the metallic ions that pass through the solid electrolyte membrane 13 by applying voltage between the anode 11 and substrate W is a straight passage orthogonally extending from one surface to the other surface of the solid electrolyte membrane 13 (i.e. a passage extending along a direction orthogonal to the solid electrolyte membrane 13).

However, in the second portion 13b of the solid electrolyte membrane 13 used in the present embodiment, the metallic ions M cannot move through the solid electrolyte membrane 13 in a straight perpendicular line, and thus the metallic ions inevitably move through passages avoiding the fibers 13c of the second portion 13b.

This phenomenon is referred to as shadowing, and a portion of the solid electrolyte membrane 13 in which the metallic ions M inevitably move through the passages avoiding the fibers 13c is referred to as a shadow section S. Introducing the shadow section S into the solid electrolyte membrane 13 by using the fibers 13c of the second portion 13b encourages reduction in amount of the metallic ions M passing through the portion of the solid electrolyte membrane 13, the portion actively conveying the metallic ions M, to thereby increase operating voltage of the solid electrolyte membrane 13.

Here, a portion of the substrate W, the portion facing the shadow section S in the solid electrolyte membrane 13 adjacent to the substrate W in the direction where metallic ion fluxes pass through the first portion 13a, is referred to as a blind section B. In the solid electrolyte membrane 13 of the present embodiment, the fibers 13c of the second portion 13b are locally disposed in the surface located on the substrate W side of the solid electrolyte membrane 13 so as to decrease the shadow section S in a thickness direction of the solid electrolyte membrane 13. It is thereby possible to suppress increase in operating voltage of the solid electrolyte membrane 13.

During the film formation, by applying voltage between the anode 11 and the substrate W, the metallic ions M are soaked inside the solid electrolyte membrane 13, and the metal is precipitated from the metallic ions M to the surface of the substrate W.

At this time, in the section where the substrate W and the fibers 13c of the second portion 13b are in contact with each other (i.e. the blind section B) as well as the vicinity of this region, a slight amount of the metallic solution L having permeated the solid electrolyte membrane 13 is formed as a Nernst diffusion layer R (see FIG. 7). A diffusion limiting current I in the Nernst diffusion layer R is in inverse proportion to a thickness of the Nernst diffusion layer R, as shown in the following formula.

$$I = Z \times F \times D \times C / \delta$$

where I: diffusion limiting current, Z: valence number of metallic ions, F: Faraday constant, D: diffusion constant, C: concentration of metallic solution (electrolyte), δ: Nernst diffusion layer R.

Specifically, due to the shadowing, the metallic ions M moving along an interface between the fibers 13c of the second portion 13b and the first portion are likely to be conveyed to the section where the substrate W and the fibers 13c are in contact with each other (blind section B) because a thickness of the Nernst diffusion layer R in the section where the substrate W and the fibers 13c are in contact with each other is thinner than a thickness of the Nernst diffusion layer R in the other portions.

Specifically, due to the pressurizing onto the substrate W by the solid electrolyte membrane 13, the Nernst diffusion layer R having the thickness in the blind section B with the fibers 13c in contact is decreased, to thereby increase the above-described diffusion limiting current; therefore, the metallic ions M are collected to the interface between the substrate W and the fibers 13c, and the metal is thereby precipitated to this portion.

In addition, when the metal film is formed under a condition to form a smooth metal film having a predetermined thickness, the metallic projections f having a thicker thickness than the predetermined thickness are formed on the metal film F formed by the film forming apparatus 1. This reason will be explained, hereinafter.

Field electron emission is a phenomenon that electrons are emitted from a solid surface by externally applying an electric field to increase a tunneling probability (e.g. see O. Ujsaghy Phys. rev. Lett. 85,12,2558,2000). In order to emit electrons from the solid surface to the outside, energy equal to the work function should be given from an electronic level until a vacuum level of the solid body, and if the energy is not more than this, the electrons are repelled against an image potential barrier. When voltage is externally applied to form an external electric field potential, and a barrier of a synthetic potential of the external electric field potential and the image potential is thereby generated. Then, the electrons are emitted from the solid surface into vacuum with energy not more than the work function; and this phenomenon is called as the Schottky effect.

As the externally applied voltage is gradually increased, the gradient of the external electric field potential becomes greater, and the barrier of the synthetic potential having a width with reference to the Fermi level is generated. Because electrons have wave-particle duality, there exist electrons passing through the barrier of the width due to the tunnel effect.

The electrons having passed through the potential barrier are emitted and accelerated to the outside by the external electric field potential. At this time, by gradually increasing the voltage externally applied, the potential width becomes thinner, and thus the tunnel probability becomes increased. By forming the solid body in a recess-projection shape, it is possible to generate a non-uniform electric field so as to increase the tunnel probability from the surface.

With the above tunnel effect, the metallic projections f formed on the surface of the substrate W shown in FIG. 8 are externally provided with the electric field through further film formation; thus, field electron emission becomes easier as the distance between the metallic projections f formed on the surface of the substrate W and the solid electrolyte membrane 13 is shorter. Therefore, it can be considered that due to the shadowing, the metallic ions M, moving along the interface between the fibers 13c of the second portion 13b and the solid electrolyte membrane 13, are trapped more frequently by the electrons emitted from the metallic projections f; therefore, the thickness of the metallic projections f becomes thicker than the predetermined thickness.

That is, if the film formation according to the present embodiment is carried out, the penetration probability (tunnel probability) T of the electrons is exponentially changed depending on the distance between the fibers 13c and the metallic projections f, as shown in the following Formula.

$$T \propto \exp\left(\frac{-2z\sqrt{2m}}{h}\sqrt{\Phi + \frac{eV}{2} - E}\right),$$

where T:penetration probability of electrons, z:distance between fibers 13c and metallic projections f, m:mass of electron e, h:Planck constant/$2\pi$, $\varphi$:work function, V:voltage, E: electronic energy.

In the film formation, due to the pressing by the pressing part 17, the distance z between the fibers 13c and the metallic projections f during the film formation becomes shorter; therefore, the penetration probability of the electrons becomes higher, thus encouraging the growth of the metallic projections f.

Figure 9:
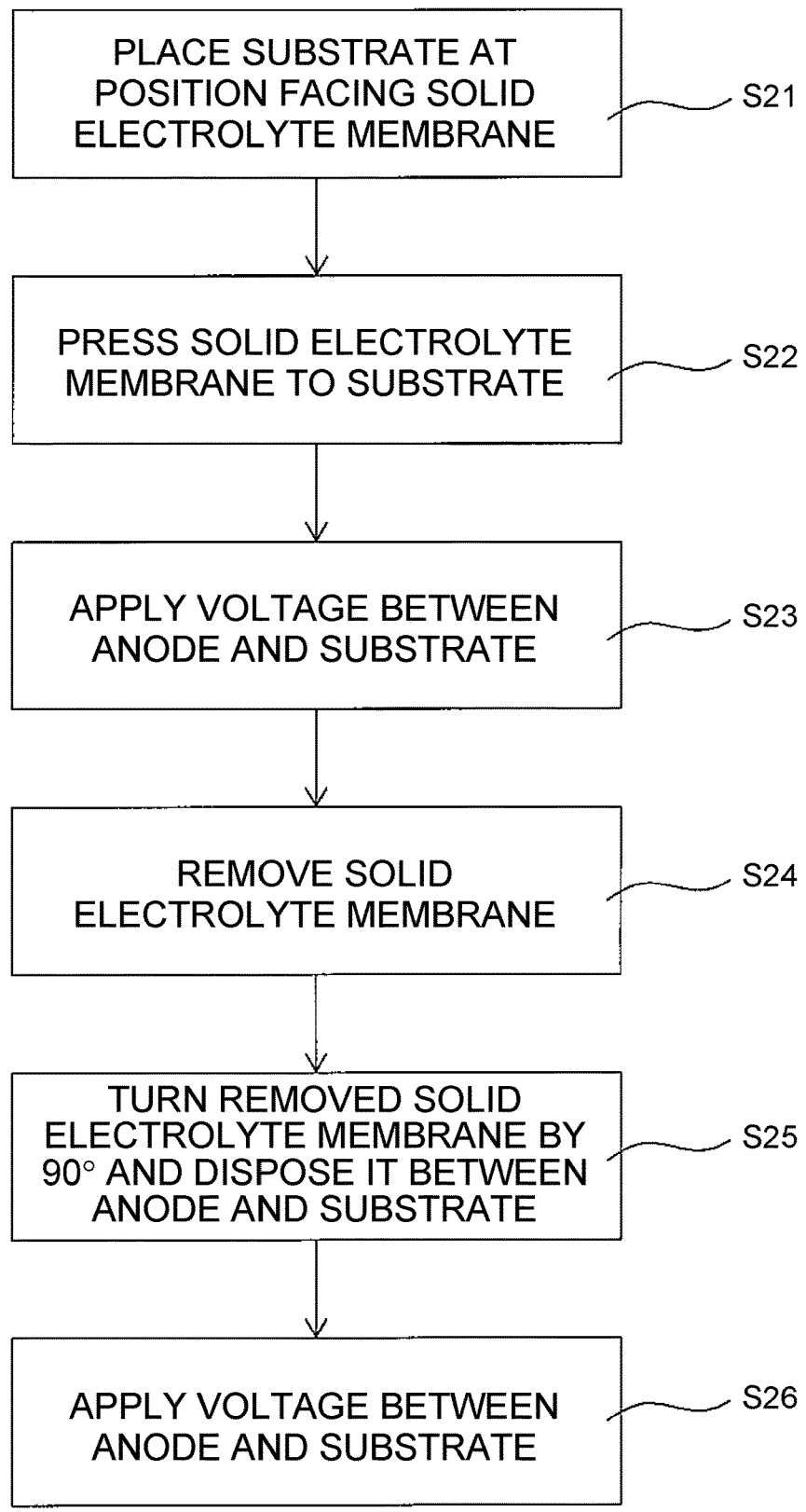
FIG. 9 is a flowchart explaining a second film forming method using the film forming apparatus shown in FIG. 3.
Figure 10:
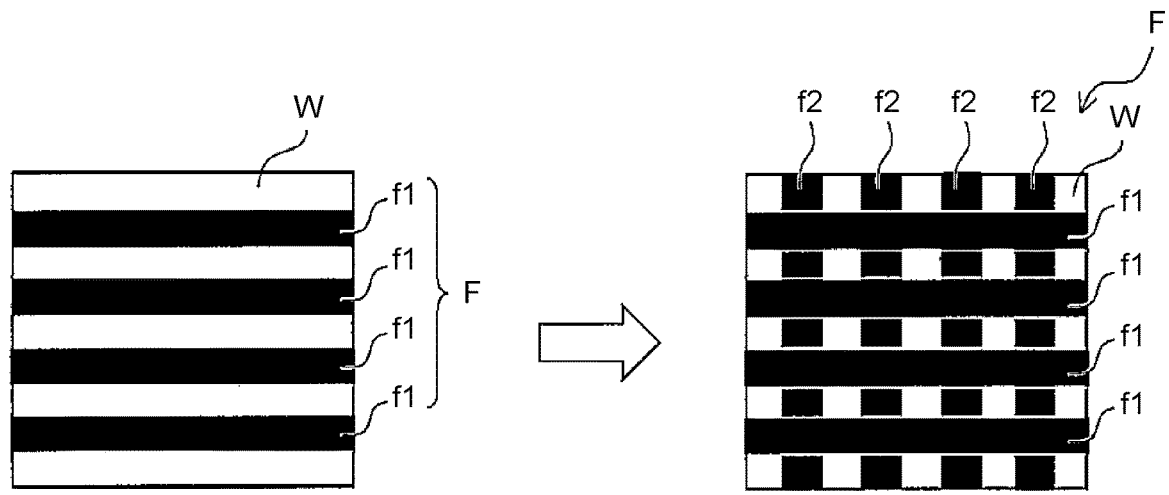
FIG. 10 is a schematic outline view explaining a metal film formed in the second film forming method shown in FIG. 9.

A second film forming method for the metal film according to the embodiment will be described, hereinafter. FIG. 9 is a flowchart explaining the second film forming method using the film forming apparatus 1 shown in FIG. 3. FIG. 10 is a schematic outline view explaining the metal film F formed by the second film forming method shown in FIG. 9.

First, step S21 to step S23 are the same as the respective steps in the first film forming method. Specifically, as shown in FIG. 9, in step S21, the substrate W is placed at a position facing the first solid electrolyte membrane 13A. With this, the first solid electrolyte membrane 13A is disposed between the anode 11 and the substrate W. In the film forming apparatus 1 shown in FIG. 3, with the above-described structure, the metallic solution L is set in the solution storage part 15 such that the metallic solution L containing the metallic ions comes in contact with the first solid electrolyte membrane 13A from the anode 11 side.

Next, in step S22, the first solid electrolyte membrane 13A is pressed onto the substrate W by the pressing part 17. Subsequently, in step S23, while maintaining this pressing state, voltage is applied between the anode 11 and the substrate W by the electric power source 18 so as to form the metal film F deriving from the metallic ions on the surface of the substrate. The second portion 13b is formed by the multiple fibers 13c extending along one direction; therefore, as shown in the left drawing of FIG. 10, it is possible to form the metal film F with a stripe pattern configured by linear first metallic projections f1 where the metal is precipitated (first film forming step).

Next, proceeding to step S24, after the first film forming step, the first solid electrolyte membrane 13A together with the solution storage part 15 are lifted up to remove the first solid electrolyte membrane 13A from the substrate W. Then, in step S25, with the substrate W (metal film F) facing the first solid electrolyte membrane 13A, while the position of the substrate W is retained, the first solid electrolyte membrane 13A is turned by 90°, and is mounted to the solution storage part 15. With this operation, the first solid electrolyte membrane 13A is disposed between the anode 11 and the substrate W.

As described above, even if the first solid electrolyte membrane 13A is removed, the metallic solution L stored in the solution storage part 15 is prevented by the second solid electrolyte membrane 13B from leaking out from the solution storage part 15. In the present embodiment, the first solid electrolyte membrane 13A is turned by 90°, but for example, the first solid electrolyte membrane 13A may not be turned, and only the substrate W may be turned by 90°.

Next, proceeding to step S26, the solid electrolyte membrane 13 is pressed onto the substrate W, and voltage is applied between them by the electric power source 18. With this operation, as shown in the right drawing of FIG. 10, linear second metallic projections f2 where the metal is precipitated are formed along a direction intersecting the direction where the first metallic projections f1 extend; and the metal film F with a grid pattern is formed by the second metallic projections f2 and the first metallic projections f1 (second film forming step). In the present embodiment, in step S25, because the first solid electrolyte membrane 13A is turned by 90°, the linear first metallic projections f1 and the linear second metallic projections f2 intersect each other at 90°. If the linear first metallic projections f1 and the linear second metallic projections f2 are attempted to intersect each other at a desired angle, in step S25, the film formation may be carried out after the solid electrolyte membrane 13 or the substrate W is turned at this desired angle.

By carrying out steps S21 to S26 in series, the metal film F with a grid pattern can be formed; therefore, it is possible to enhance the anchor effect of the surface of the substrate W. In such a film formation, if a support body of an electrode (positive electrode) formed by nickel for a dischargeable battery (e.g. a nickel-hydrogen battery) is used as a substrate, and a solution containing nickel ions is used as the metallic solution, it is possible to form a metal film with a grid pattern on the surface of the electrode support body. With this, it is possible to enhance the anchor effect with respect to a positive electrode active material or an active substance support material that adheres to the electrode support body configuring the electrode.

Furthermore, if an electrode (emitter or collector) of a semiconductor of which surface is coated with nickel or a nickel electrode is used as the substrate, and a solution containing nickel ions is used as the metallic solution, it is possible to form a metal film with a grid pattern on the surface of the electrode. With this, it is possible to enhance the anchor effect with respect to resin or solder in contact with this electrode.

Confirmation Test

Film formation of metal films was carried out by the following method. Specifically, films were formed by a film forming apparatus having the basic configuration of the film forming apparatus shown in FIG. 3. This film forming apparatus is different from the film forming apparatus shown in FIG. 3 in that an anode is a non-porous anode, and a flowing structure of the metallic solution flowing between the anode and the solid electrolyte membrane is employed.

First, as the anode, a nickel plate (NI-313551, dimension: 2t×40×50 mm, manufactured by The Nilaco corporation) was prepared. As the metallic solution, a solution (pH 3.0) containing nickel chloride of 1M and acetic acid-nickel acetate buffer solution of 0.5M was prepared. Next, as the second solid electrolyte membrane, an ion exchange membrane (electrolyte membrane:N117, manufactured by Sigma-Aldrich), and the first solid electrolyte membrane (an electrolyte membrane a:N424, and an electrolyte membrane b:N324, manufactured by Sigma-Aldrich) were prepared.

In each of the electrolyte membrane a and the electrolyte membrane b, the second portion formed by leno weave fabric shown in FIG. 2C and others was embedded in the first portion. The aspect ratio of the section of each yarn that is a fiber included in the electrolyte membrane a was within a range of 1 to 3, and the aspect ratio of the section of each yarn that is a fiber included in the electrolyte membrane b was within a range of 1.5 to 3. The aspect ratio is a ratio of a width of a longer axis of the section (maximum width of the section) and a width of a shorter axis orthogonal to this longer axis.

Next, as the substrate (cathode), a nickel foil (film thickness: 15 μm, dimension: 1260×350 mm, manufactured by Fukuda Metal Foil & Powder Co., Ltd.) was used. The film forming condition was as follows: a temperature of the substrate was 80° C., a pressing pressure was 0.1 MPa, a film forming speed was 0.20 μm/min., and a nickel film forming area was 2.5 cm×2.5 cm.

The film formation was carried out by the second film forming method shown in FIG. 9. In the first film forming step, a metal film with a stripe pattern was formed. This can be considered that metallic projections were formed on the surface facing woofs of the leno weave fabric. Next, in the second film forming step, the first solid electrolyte membrane was removed from the film forming apparatus, and then the first solid electrolyte membrane was mounted to the film forming apparatus again while the first solid electrolyte membrane is turned by 90° so as to carry out the metal film formation.

Figure 11:
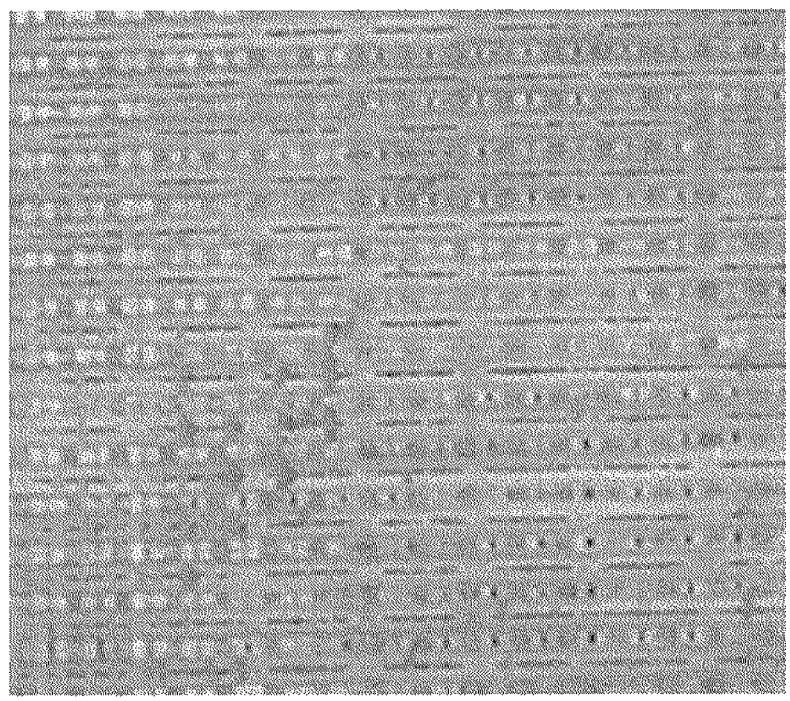
FIG. 11 is a view showing a photograph of a surface of a metal film formed in a confirmation test.
Figure 12:
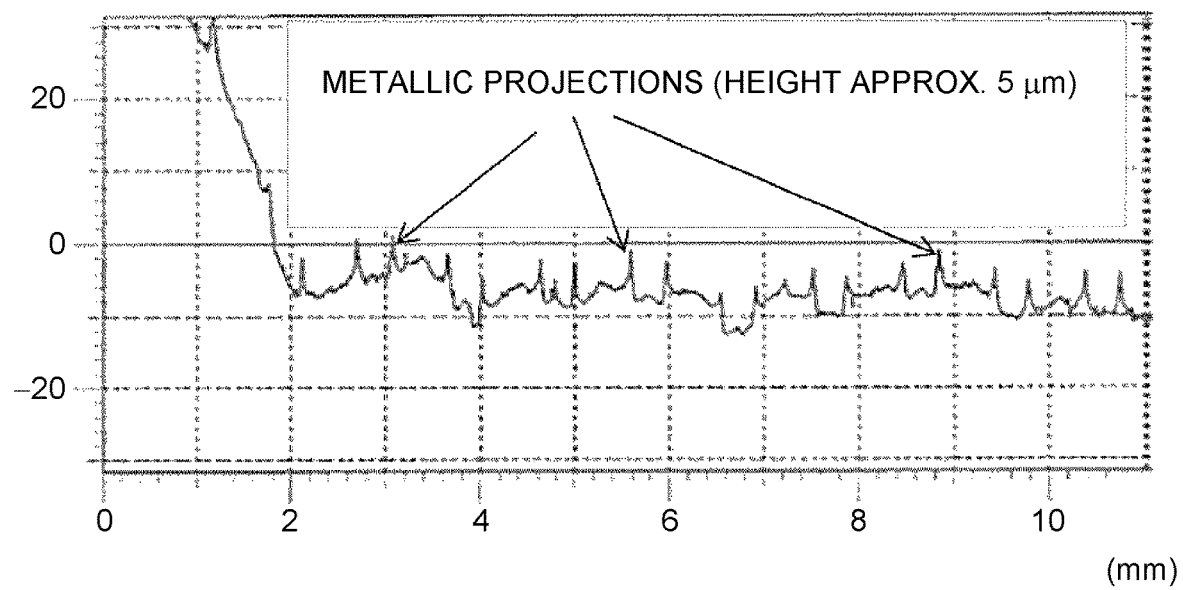
FIG. 12 is a graph showing measurement results of a surface roughness of the metal film formed in the confirmation test.

The metal film obtained through this film formation was observed. FIG. 11 shows a photograph of a surface of the metal film formed in the confirmation test using the electrolyte membrane a. Furthermore, in order to confirm heights of the metallic projections of the metal film, a profile curve (surface roughness) was measured by a roughness meter (SURFCOM1400G25, manufactured by Tosei Systems Co., Ltd.). FIG. 12 is a graph showing measurement results of the surface roughness of the metal film formed in the confirmation test using the electrolyte membrane a.

As shown in FIG. 11 and FIG. 12, in the case of using the electrolyte membrane a, it was confirmed that a metal film with a grid pattern was formed; and the height of the metallic projections was 5 μm. Similarly, in the case of using the electrolyte membrane b, it was also confirmed that a metal film with a grid pattern was formed; and the height of the metallic projections was 20 μm.

As described above, although one embodiment of the present disclosure has been described in detail, the present disclosure is not limited to the embodiment, and various design changes can be carried out without departing from the scope and spirit of the present disclosure described in the claims.

In the aforementioned embodiment, no metal is precipitated in the portion facing the first portion; however, by setting the fiber intervals to be wider, a metal film having a thinner thickness than that of the second portion may be formed on the surface of the substrate facing the first portion. In this case, the metal film facing the second portion is also formed with metallic projections having a shape shown in FIG. 11.

What is claimed is:

1. A film forming apparatus for a metal film, the apparatus comprising:
    an anode;
    a solid electrolyte membrane disposed between the anode and a substrate;
    a solution storage part storing a metallic solution containing metallic ions such that the metallic solution comes in contact with the solid electrolyte membrane from an anode side of the solid electrolyte membrane;
    a pressing part pressing the solid electrolyte membrane to the substrate; and
    an electric power source applying voltage between the anode and the substrate,
    wherein
    the film forming apparatus forms the metal film deriving from the metallic ions on a surface of the substrate by applying voltage by the electric power source,
    wherein
    the solid electrolyte membrane includes:
    a first portion made of an ion permeable material that the metallic ions permeate; and
    a second portion made of a material having an electric insulating property and having a lower permeability of the metallic ions than a permeability of the ion permeable material,
    the second portion being entirely embedded in the first portion except for at least a portion of the second portion being exposed from a surface of the solid electrolyte membrane, the portion of the second portion being closest to the substrate than other portions of the second portion, the surface of the solid electrolyte membrane facing the substrate, and
    the second portion is formed such that when the voltage is applied, the metallic ions passing through the first portion pass around the second portion, and a metal of the metallic ions is precipitated on the surface of the substrate, the surface of the substrate facing the second portion.

2. The film forming apparatus for the metal film according to claim 1, wherein
    the surface of the solid electrolyte membrane from which the second portion is exposed includes portions swelling toward a side where the substrate is disposed.

3. The film forming apparatus for the metal film according to claim 1, wherein
    the second portion includes multiple fibers.

4. The film forming apparatus for the metal film according to claim 3, wherein
    the multiple fibers extend along one direction with intervals between the fibers.

5. The film forming apparatus for the metal film according to claim 1, wherein
    the solid electrolyte membrane is set to be a first solid electrolyte membrane, and
    a second solid electrolyte membrane made of an ion permeable material that the metallic ions permeate is stacked on the first solid electrolyte membrane on a side where the second solid electrolyte membrane comes in contact with the metallic solution in the solution storage part.

* * * * *